(12) United States Patent
Alpert et al.

(10) Patent No.: US 9,645,242 B2
(45) Date of Patent: May 9, 2017

(54) DEVICE, SYSTEM AND METHOD OF COLLABORATIVE LOCATION ERROR CORRECTION

(75) Inventors: Yaron Alpert, Hod Hasharon (IL); Haim Rochberger, Tel Mond (IL)

(73) Assignee: INTEL CORPORATION, Santa Clara, CA (US)

( * ) Notice: Subject to any disclaimer, the term of this patent is extended or adjusted under 35 U.S.C. 154(b) by 140 days.

(21) Appl. No.: 13/976,471

(22) PCT Filed: Apr. 10, 2012

(86) PCT No.: PCT/US2012/032844
§ 371 (c)(1),
(2), (4) Date: Nov. 17, 2014

(87) PCT Pub. No.: WO2013/154533
PCT Pub. Date: Oct. 17, 2013

(65) Prior Publication Data
US 2015/0065159 A1 Mar. 5, 2015

(51) Int. Cl.
*G01S 19/07* (2010.01)
*G01S 5/02* (2010.01)
*H04W 4/02* (2009.01)

(52) U.S. Cl.
CPC .............. *G01S 19/07* (2013.01); *G01S 5/021* (2013.01); *H04W 4/02* (2013.01)

(58) Field of Classification Search
CPC ....... H04W 4/02; H04W 4/025; H04W 4/026; H04W 64/00; H04W 84/042;
(Continued)

(56) References Cited

U.S. PATENT DOCUMENTS

| 5,617,100 A | * | 4/1997 | Akiyoshi | ............... G01S 5/009 342/352 |
| 6,154,656 A | | 11/2000 | Camp, Jr. | |

(Continued)

FOREIGN PATENT DOCUMENTS

| EP | 1 548 456 | 6/2005 |
| JP | 2003207556 | 7/2003 |

(Continued)

OTHER PUBLICATIONS

Office Action for U.S. Appl. No. 13/976,469, mailed on Sep. 26, 2014, 14 pages.

(Continued)

*Primary Examiner* — Christopher M Brandt
*Assistant Examiner* — Jing Gao
(74) *Attorney, Agent, or Firm* — Shichrur & Co.

(57) ABSTRACT

Some demonstrative embodiments include devices, systems and/or methods of collaboratively correct location errors. For example, a device may include a collaborative location error corrector to collaboratively correct location errors for at least one group of two or more wireless communication devices, the location error corrector is to receive from at least a first wireless communication device of the group an error report indicating an error in an estimated location of the first wireless communication device, to determine correction information based at least on the error report from the first wireless communication device, and to provide the correction information to at least a second wireless communication device of the group.

21 Claims, 5 Drawing Sheets

(58) Field of Classification Search
CPC ..... H04W 4/028; H04W 4/021; H04W 4/023; H04W 4/027; H04W 64/003; H04W 84/12; G01S 19/07
USPC ...................................................... 455/456.1
See application file for complete search history.

(56) References Cited

U.S. PATENT DOCUMENTS

| | | | |
|---|---|---|---|
| 2003/0101225 | A1 | 5/2003 | Han et al. |
| 2003/0128163 | A1 | 7/2003 | Mizugaki et al. |
| 2004/0172418 | A1* | 9/2004 | Dorum .............. G06F 17/30241 |
| 2006/0230137 | A1 | 10/2006 | Gare et al. |
| 2008/0082225 | A1 | 4/2008 | Barrett |
| 2008/0244184 | A1 | 10/2008 | Lewis et al. |
| 2008/0249713 | A1 | 10/2008 | Sessions |
| 2009/0189811 | A1 | 7/2009 | Tysowski et al. |
| 2009/0192709 | A1 | 7/2009 | Yonker et al. |
| 2009/0287415 | A1 | 11/2009 | Buerger et al. |
| 2010/0291950 | A1 | 11/2010 | Lin et al. |
| 2010/0295726 | A1 | 11/2010 | Tann |
| 2010/0324819 | A1 | 12/2010 | Nurminen et al. |
| 2011/0077862 | A1 | 3/2011 | Huang et al. |
| 2011/0117924 | A1* | 5/2011 | Brunner ................ G01S 5/0252 455/456.1 |
| 2012/0136849 | A1 | 5/2012 | Niranjan et al. |
| 2012/0315928 | A1 | 12/2012 | Hashimoto et al. |
| 2013/0030700 | A1 | 1/2013 | Miller et al. |
| 2013/0238857 | A1 | 9/2013 | Daniel et al. |
| 2013/0261964 | A1 | 10/2013 | Goldman et al. |
| 2013/0337834 | A1 | 12/2013 | Alpert et al. |
| 2014/0003542 | A1 | 1/2014 | Zukerman et al. |

FOREIGN PATENT DOCUMENTS

| | | |
|---|---|---|
| JP | 2006503345 | 1/2006 |
| JP | 2010151725 | 7/2010 |
| JP | 2010223684 | 10/2010 |
| JP | 2010232944 | 10/2010 |
| JP | 2011149860 | 8/2011 |
| KR | 20060092894 | 8/2006 |
| WO | 02076118 A1 | 9/2002 |
| WO | 2009078080 | 6/2009 |
| WO | 2009149417 | 12/2009 |
| WO | 2010073113 | 7/2010 |

OTHER PUBLICATIONS

Final Office Action for U.S. Appl. No. 13/533,006, mailed on Oct. 6, 2014, 33 pages.
International Preliminary Report on Patentability for PCT Application No. PCT/US2012/031318, mailed on Oct. 9, 2014, 6 pages.
International Preliminary Report on Patentability for PCT Application No. PCT/US2012/032844, mailed on Oct. 23, 2014, 9 pages.
International Preliminary Report on Patentability for PCT Application No. PCT/US2013/029350, mailed on Sep. 18, 2014, 10 pages.
Office Action for U.S. Appl. No. 13/533,006, mailed on Dec. 29, 2014, 54 pages.
Office Action for U.S. Appl. No. 13/533,006, mailed on Jun. 24, 2015, 61 pages.
Office Action for U.S. Appl. No. 13/533,006, mailed on Apr. 11, 2014, 41 pages.
European Search Report for European Patent Application Serial No. 13757185.7, mailed on Oct. 16, 2015, 8 pages.
European Search Report for European Patent Application Serial No. 12873393.8, mailed on Oct. 29, 2015, 6 pages.
Office Action for Korean Patent Application Serial No. 20147027175, mailed on Jan. 29, 2016, 8 pages, including 4 pages of English translation.
International Search Report and Written Opinion for PCT/US2012/031318, mailed on Nov. 28, 2012; 9 pages.
International Search Report and Written Opinion for PCT/US2013/029350, mailed on Jun. 2, 2013; 14 pages.
OMA Secure User Plane Location Architecture, Candidate Version 2.0—May 27, 2011; Open Mobile Alliance OMA-AD-SUPL-V2_0-20110527-C; 54 pages.
Geolocation API Specfication, W3C Candidate Recommendation Sep. 7, 2010. Andrei Popescu, Google, Inc. ; 14 pages.
International Search Report and Written Opinion for PCT/US2012/032844, mailed on Aug. 23, 2013; 12 pages.
Office Action for Japanese Patent Application No. 2014-561074, mailed on Aug. 25, 2015, 5 pages (including 2 pages of English translation).
Office Action for Korean Patent Application No. 2014-7025147, mailed on Sep. 9, 2015, 8 pages (including 4 pages of English translation).
Office Action for Japanese Patent Application Serial No. 2014-561074, mailed on May 17, 2016, 5 pages (Including 2 page of English translation.).
Examiner's Answer in response to Appeal Brief for U.S. Appl. No. 13/533,006, mailed on Jul. 29, 2016, 27 pages.

* cited by examiner

DEVICE, SYSTEM AND METHOD OF COLLABORATIVE LOCATION ERROR CORRECTION

CROSS REFERENCE

This application is a National Phase Application of PCT International Application No. PCT/US2012/032844, International Filing Date Apr. 10, 2012, the entire disclosure of which is incorporated herein by reference.

BACKGROUND

An application executed by a mobile device may use location data received from one or more location data origin transmitters to determine an estimated location of the mobile device. For example, a road navigation application may use location data, which may be received, for example, from one or more satellites of a Global Navigation Satellite System (GNSS).

Some of the location data, e.g., location fix (fix) data, i.e., coordinates, may have a relatively low level of accuracy, e.g., an accuracy of about 5-200 meters. For example, the low level of accuracy may result from uncertainty of satellite geometry, satellite orbit, atmospheric affects, and the like.

The application may use local error correction methods, which may be executed by the application. For example, the road navigation application may receive the location fix data from the GNSS system, and may utilize a local error correction method, which may compare the location fix data to a geographical database, in order to determine inconsistency. For example, the error corrector may assume that the mobile device is in a vehicle, which is assumed to be on a road. If the location fix data does not position the mobile device on the road, for example, on a field or in an offset from the road, the error corrector of the application may correct the location fix to be on the road.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

Some embodiments may be used in conjunction with various devices and systems, for example, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a wired or wireless network, a wireless area network, a Wireless Video Area. Network (WVAN), a Local Area Network (LAN), a Wireless LAN (WLAN), a Wireless Metropolitan Area Network (WMAN) communication system, a Personal Area Network (PAN), a Wireless PAN (WPAN), devices and/or networks operating in accordance with existing IEEE 802.11 standards ("the 802.11 standards"), e.g., including IEEE 802.11 (IEEE 802.11-2007: *Standard for Information technology Telecommunications and information exchange between systems—Local and metropolitan area networks—Specific requirements, Part* 11: *Wireless LAN Medium Access Control* (*MAC*) *and Physical Layer* (*PHY*) *Specifications—June* 2007), 802.11n ("*IEEE* 802.11*n*-2009*—Amendment* 5: *Enhancements for Higher Throughput IEEE-SA.* 29 *Oct.* 2009"), 802.11ac ("*Very High Throughput<*6 *Ghz*"), 802.11 task group ad (TGad) ("*Very High Throughput* 60 *GHz*"), and/or future versions and/or derivatives thereof, devices, and/or networks operating in accordance with IEEE 802.16 standards ("the 802.16 standards"), e.g., including 802.16 (*IEEE-Std* 802.16, 2004 *Edition, Air Interface for Fixed Broadband Wireless Access Systems*), 802.16d, 802.16e (*IEEE-Std* 802.16*e*, 2005 *Edition, Physical and Medium Access Control Layers for Combined Fixed and Mobile Operation in*

*Licensed Bands*), 802.16f, 802.16m standards and/or future versions and/or derivatives thereof, devices, and/or networks operating in accordance with existing Wireless-Gigabit-Alliance (WGA) and/or WirelessHD™ specifications and/or future versions and/or derivatives thereof, devices and/or networks operating in accordance with existing cellular specifications and/or protocols, e.g., 3rd Generation Partnership Project (3GPP), 3GPP Long Term Evolution (LTE), and/or future versions and/or derivatives thereof, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Global Navigation Satellite System (GNSS) device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Global Navigation Satellite System (GNSS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), Bluetooth (BT), Near Field Communication (NFC), or the like. Other embodiments may be used in various other devices, systems and/or networks.

The term "wireless device" as used herein includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may be used to provide a wireless service.

Figure 1:
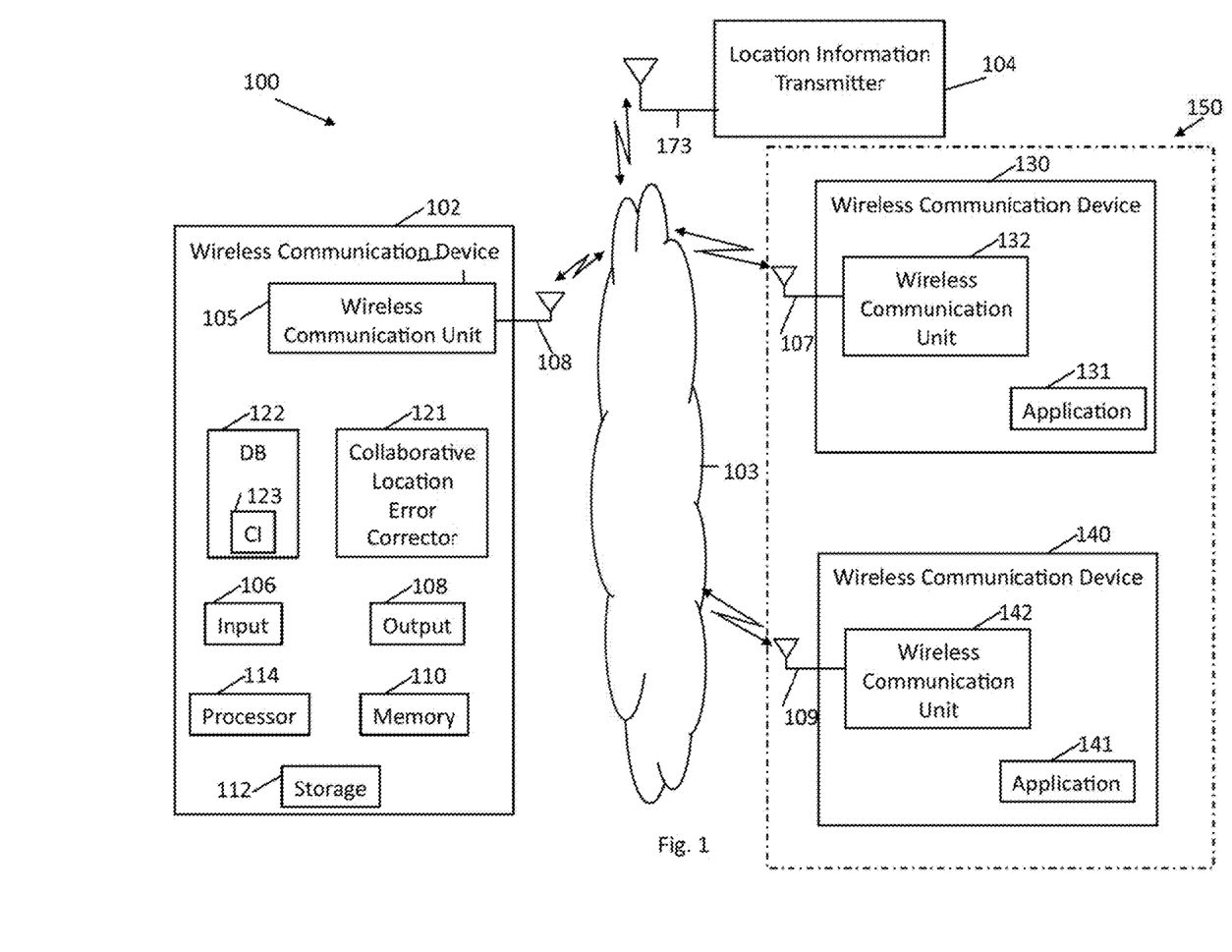
FIG. 1 is a schematic block diagram illustration of a system, in accordance with some demonstrative embodiments.

Reference is now made to FIG. 1, which schematically illustrates a block diagram of a wireless communication system 100, in accordance with some demonstrative embodiments.

In some demonstrative embodiments, system 100 may include a wireless communication network including one or more wireless communication devices, e.g., wireless communication devices 102, 130 and/or 140, capable of communicating content, data, information and/or signals over one or more suitable wireless communication mediums 103.

In some demonstrative embodiments, wireless communication mediums 103 may include one or more unidirectional and/or single-directional wireless channels, for example, a Radio Frequency (RF) channel, a WiFi channel, a Bluetooth channel, a cellular channel, a GNSS Channel, an NFC channel, and the like.

In some demonstrative embodiments, wireless communication devices 102, 130 and/or 140 may include any suitable components for communicating, i.e., transmitting and/or receiving, wireless communication signals over wireless mediums 103. For example, device 102 may include a wireless communication unit 105 to communicate via one or more antennas 107, device 130 may include a wireless communication unit 132 to communicate via one or more antennas 108, and/or device 140 may include a wireless communication unit 142 to communicate via one or more antennas 109.

In some demonstrative embodiments, antennas 107, 108 and/or 109 may include any type of antennas suitable for transmitting and/or receiving wireless communication signals, blocks, frames, transmission streams, packets, messages and/or data. Types of antennas that may be used for antennas 107, 108 and/or 109 may include but are not limited to internal antenna, dipole antenna, omnidirectional antenna, a monopole antenna, an end fed antenna, a circularly polarized antenna, a micro-strip antenna, a diversity antenna, a phase array antenna and the like. In some embodiments, antennas 107, 108 and/or 109 may implement transmit and receive functionalities using separate transmit and receive antenna elements. In some embodiments, antennas 107, 108 and/or 109 may implement transmit and receive functionalities using common and/or integrated transmit/receive elements.

In some demonstrative embodiments, devices 130 and/or 140 may include, or may be included as part of a mobile or portable device, for example, a PC, a desktop computer, a mobile computer, a mobile computer, a laptop computer, a notebook computer, a tablet computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a cellular telephone, a PCS device, a FDA device which incorporates a wireless communication device, a mobile or portable GPS device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a BD player, a BD recorder, a DVD player, a HD DVD player, a DVD recorder, a HD DVD recorder, a PVR, a broadcast HD receiver, a video sink, an audio sink, a stereo tuner, a broadcast radio receiver, a flat panel display, a PMP, a DVC, a digital audio player, a speaker, an audio receiver, a gaming device, an audio amplifier, a data source, a data sink, a DSC, a media player, a Smartphone, a television, a music player, or the like.

In some demonstrative embodiments, device 102 may include a mobile device. In other embodiments, device 102 may be implemented as a non-mobile device.

In some demonstrative embodiments, devices 102, 130 and/or 140 may include, for example, one or more of a processor 114, an input unit 106, an output unit 108, a memory unit 110, and a storage unit 112. Device 102 may optionally include other suitable hardware components and/or software components. In some embodiments, some or all of the components of device 102 may be enclosed in a common housing or packaging, and may be interconnected or operably associated using one or more wired or wireless links. In other embodiments, components of device 102 may be distributed among multiple or separate devices or locations.

Processor 114 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 114 executes instructions, for example, of an Operating System (OS) of wireless communication device 102, and/or of one or more suitable applications.

Input unit 106 includes, for example, a keyboard, a keypad, a mouse, a touch-pad, a track-ball, a stylus, a microphone, or other suitable pointing device or input device. Output unit 108 includes, for example, a monitor, a screen, a flat panel display, a Cathode Ray Tube (CRT) display unit, a Liquid Crystal Display (LCD) display unit, a plasma display unit, one or more audio speakers or earphones, or other suitable output devices.

Memory unit 110 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 111 includes, for example, a hard disk drive, a floppy disk drive, a Compact Disk (CD) drive, a CD-ROM drive, a DVD drive, or other suitable removable or non-removable storage units. Memory unit 110 and/or storage unit 112, for example, may store data processed by wireless communication device 102.

In some demonstrative embodiments, devices 102, 130 and/or 140 may be capable of receiving wireless communication signals including raw location information, e.g., over wireless mediums 103. For example, wireless communication units 105, 132 and/or 142 may include a GNSS receiver.

In some demonstrative embodiments, system 100 may include at least one device 104 configured to communicate the wireless communication signals including the raw location information via one or more antennas 173. For example, device 104 may include one or more location data origin transmitters, e.g., GNSS satellites to generate GNSS-based raw location information, AP's to generate WiFi-based raw location information, cellular base stations to generate cellular location information, one or more sensors to generate raw location information, and the like.

In some demonstrative embodiments, the raw location information may be related, for example, to a location of device 104, and/or to a relative location between device 104 and devices 102, 130 and/or 140.

In some demonstrative embodiments, devices 130 and/or 140 may be capable of estimating a location, e.g., coordinates represented by location information (fix) data, of devices 130 and/or 140, respectively, based on the raw location information. For example, device 130 may include a mobile GPS device, e.g., residing in a vehicle, and configured to estimate a location of the vehicle, and/or device 140 may include a mobile phone having a GPS antenna.

In some demonstrative embodiments, devices 130 and/or 140 may include an application 131 and/or an application 141, respectively, configured to provide one or more services based on the location information. For example, applications 131 and/or 141 may include a road/terrain navigation application, which may use the location information in order to navigate a vehicle on a road/terrain. In another example, applications 131 and/or 141 may include a consumer application, a social application, an entertainment application, a sport application, e.g., a running application, a bicycle tour application, and the like, a location based recommendation application, e.g., a restaurant recommendation application, a touristic location recommendation application, an entertainment recommendation application and the like, a tracking application, e.g., a fleet management application, a delivery management application, a transportation management application, and the like.

In some demonstrative embodiments, application 131 and/or application 141 may process the location information and may determine an estimated location of devices 130 and/or 140, e.g., in the form of location fix (fix) data, based on the raw location information received from device 104, e.g., by applying, for example, a triangulation method, to the raw location data.

In some demonstrative embodiments, the location fix data generated by device 130 and/or device 140 may have a relatively low level of accuracy due to various reasons. Accordingly, the estimated location of device 130 and/or device 140 may have a location error.

In one example, the location fix data may have a relatively low level of accuracy due to atmospheric effects or wave propagation effects, e.g., weather conditions, solar conditions and the like. For example, the troposphere and ionosphere may affect the propagation speed of GLASS satellite signals, which may affect the calculation of the estimated location.

In a second example, the location fix data may have a relatively low level of accuracy due to satellite orbit deviations and/or an inaccuracy related to device 104. For example, a satellite may not be in an orbit location reported by the satellite, which may affect values, e.g., indicating a position of the satellite along an orbit of the satellite, utilized for the calculation of the estimated location.

In another example, the location fix data may have a relatively low level of accuracy due to satellite geometry, e.g., a relative position between satellites, as viewed by a device receiving the location information. For example, when the device views the satellites clustered in a certain area, it may be difficult to estimate an accurate location of the device, whereas, when the satellites are distributed over a wide area the estimated location of the device may be more accurate.

In yet another example, the location fix data, may have a relatively low level of accuracy due to reflections of the GNSS satellite signals, e.g., communicated by device 104, from objects, e.g., buildings and the like, which may cause several of the GNSS satellite signals to reach the device at different times, and may affect the calculation of the estimated location.

In some demonstrative embodiments, device 102 may include a collaborative location error corrector 121 to collaboratively correct location errors for at least one group 150 of two or more wireless communication devices, e.g., including devices 130 and 140.

In some demonstrative embodiments, device 102 may include, or may be included as part of, a network server, e.g., a dedicated server, configured to serve one or more clients of wireless communication network 100, e.g., devices 130 and 140, for example, as described below with reference to FIG. 2.

In other embodiments, device 102 may include one of the devices of group 150. For example, device 130 and/or 140 may perform the functionality of device 102.

In some demonstrative embodiments, collaborative location error corrector 121 may receive from at least a first wireless communication device of group 150, e.g., device 130, an error report indicating an error of an estimated location of the first wireless communication device. Collaborative location error corrector 121 may determine correction information based at least on the error report from the first wireless communication device, and may provide the correction information to at least a second wireless communication device of group 150, e.g., device 140, as described in detail below.

In some demonstrative embodiments, group 150 may include one or more devices having a common geographical location. For example, device 140 and device 130 may be located in a common area, e.g., a state, a city, a neighborhood, and the like.

In some demonstrative embodiments, device 130 may utilize location fix data to estimate a location of device 130. For example, device 130 may utilize common GNSS technologies and/or methods to determine the location fix data.

In some demonstrative embodiments, device 130 may detect an error in the estimated location of device 130. For example, device 130 may detect an inconsistency between the location fix data and other data relating to the location of device 130, e.g., as described below.

In one example, device 130 may detect the error in the location fix based on an exact location of device 130, e.g., as defined by a user of device 130, which may be different from the location fix data generated by device 130.

In another example, device 130 may detect the error in the location fix based on various error detection methodologies. For example, device 130 may be a mobile device, e.g., a GPS mobile device, residing in a vehicle, and application 131 may be a road navigation application including maps and/or other geographical data, e.g., information relating to buildings, roads, areas of interest, and the like. Application 131 may include an algorithm, which may assume that the estimated location of device 130 should be, most of the time, on a road. Application 131 may map the location fix to a geographical map and if a map fix of device 130 is not determined to be on a road, e.g., on a river, field, or in a distance from a road, device 130 may detect an error in the estimated location of device 130.

In some demonstrative embodiments, device 130 may report the detected error in the estimated location of device 130, e.g., if the same error is repeatedly detected by device 130. For example, device 130 may report an error in the estimated location of device 130, if several map fix indications are determined to have an offset error, e.g., placing a device at a distance from a road.

In some demonstrative embodiments, device 130 may include a location estimator to estimate the location of device 130 based on the raw location data, and/or an error detector configured to detect the location errors and to report the detected errors, e.g., as described above.

In some demonstrative embodiments, collaborative location error corrector 121 may receive from device 130 an error report indicating the detected error in the estimated location of device 130.

In some demonstrative embodiments, the error report may include the location fix data of device 130, and an offset error intended to overcome the detected error in the estimated location of device 130.

For example, the error report may include the map fix of device 130 and an offset to correct the map fix of device 130. For example, the error report may include a map fix, for example, an estimated location of device 130 which is in a distance from a road, and an offset error configured to overcome the detected error and to adjust the location of device 130 to be on the road.

In some demonstrative embodiments, the error report may include assisted GPS (AGPS) information estimated by device 130. For example, the error report may include orbital data or almanac of a GPS satellite and/or time and propagation parameters of signals transmitted from a GPS satellite associated with a geographical area in which device 130 is located, e.g., London, England, Europe, and the like.

In some demonstrative embodiments, the error report may include non-GNSS information data. For example, the error report may include a correction of an estimated location of an AP, a cellular base station and the like.

In some demonstrative embodiments, device 102 may include a database (DB) 122 configured to store error reports from one or more devices of group 150. For example, DB 122 may store error reports reported by device 130.

In some demonstrative embodiments, device 102 may receive a plurality of error reports from one or more devices of group 150. For example, collaborative location error corrector 121 may receive two or more error reports from one or more devices of group 150 indicating an error in the map fix generated by the one or more devices.

In some demonstrative embodiments, collaborative location error corrector 121 may process the error reports and may determine, e.g., based on the error reports, Correction Information (CI) 123 for correcting the location estimation of devices in group 150, e.g., as described below.

For example, collaborative location error corrector 121 may receive one or more error reports from device 130 indicating a constant offset error in the location fix data generated by device 130. Collaborative location error corrector 121 may process the error reports, and may determine correction information 123 to overcome the offset error, e.g., a constant offset from the location fix data.

In some demonstrative embodiments, collaborative location error corrector 121 may store correction information 123 in database 122.

In some demonstrative embodiments, correction information 123 may include values and/or parameters to be utilized by a device of group 150, e.g., device 140, for generating a location fix of the device.

For example, correction information 123 may include long-term ephemerides parameters indicating estimated positions along an orbit of a satellite, for example, to correct an orbit error of the satellite.

In another example, correction information 123 may include time and/or speed parameters of GNSS satellite signals indicating an estimated propagation of GNSS satellite signals, for example, to correct an atmospheric-based error affecting the propagation of the signals.

In yet another example, correction information 123 may include one or more offset error parameters configured to adjust the location fix data to a corrected location, e.g., to correct a constant offset of a map fix.

In some demonstrative embodiments, collaborative location error corrector 121 may provide correction information 123 to device 140. For example, device 102 may provide modified values and/or parameters to be used by device 140 to generate a more accurate location fix data of device 140.

For example, collaborative location error corrector 121 may provide device 140 with corrected (modified) long-term ephemerides parameters. Device 140 may utilize the corrected (modified) long-term ephemerides parameters to generate a location fix of device 140, which may overcome an expected error in the estimated location of device 140, e.g., caused by a satellite orbit error.

In some demonstrative embodiments, application 141 may be configured to receive from collaborative location error corrector 121, correction information for correcting a location estimation of device 141, based on one or more error reports provided from other devices of group 150. For example, application 141 may be configured to receive correction information from collaborative location error corrector 121 to generate a more accurate location fix of device 140 based on error reports from one or more other devices of group 150, e.g., device 130.

In some demonstrative embodiments, device 130 may be capable of detecting location errors in the location fix data of device 130, while device 140 may not be capable of detecting location errors in the location fix data of device 140. For example, application 131 may include a road navigation application, and application 141 may include a social application not having location error detection and/or error correction capabilities. Accordingly, collaborative location error corrector 121 may provide device 140 with correction information, which is based on error reports received from device 130. Device 140 may be able to utilize the correction information to determine a more accurate location of device 140, e.g., although, device 140 may not have error detection and/or error correction capabilities.

Figure 2:
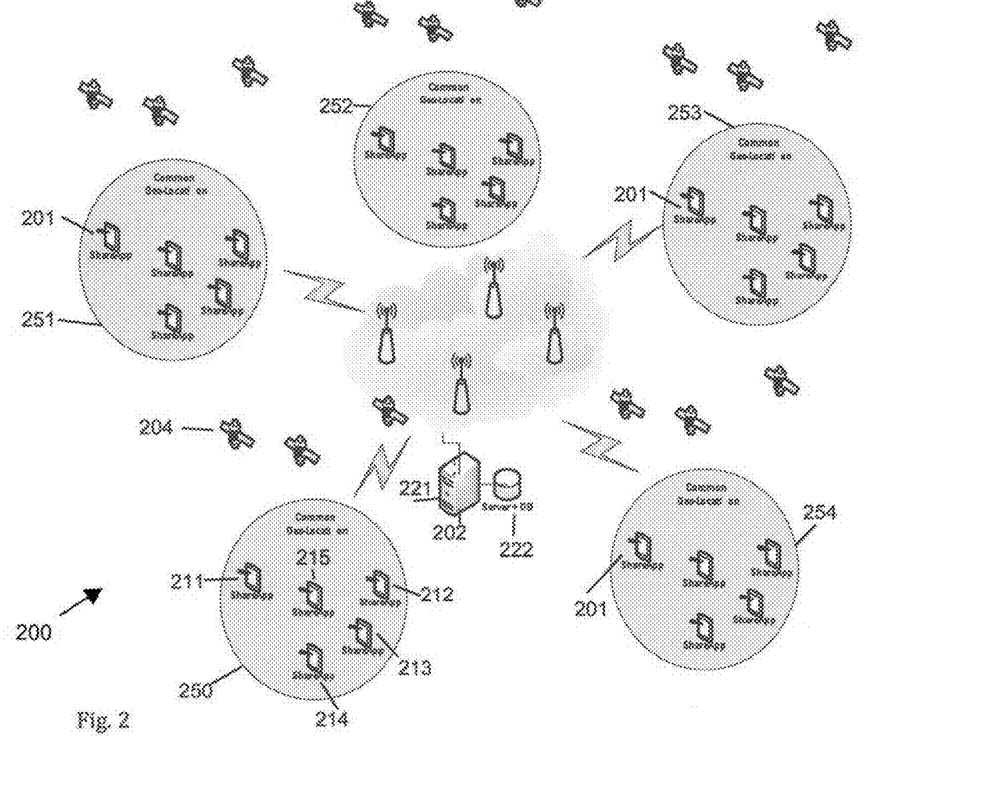
FIG. 2 is a schematic illustration of a system including a plurality of groups of wireless communication devices and a server, in accordance with some demonstrative embodiments.

Reference is now made to FIG. 2, which schematically illustrates a wireless communication system 200 including a plurality of groups, e.g., including a group 250, a group 251, a group 252, a group 253 and/or a group 254, of wireless communication devices 201.

In some demonstrative embodiments, one or more of groups 250, 251, 252, 253 and/or 254 may perform the functionality of group 150 (FIG. 1).

As shown in FIG. 2, system 200 may include a device 202 including a collaborative location error corrector 221 and a database 222. For example, device 202 may perform the functionality of device 102 (FIG. 1), collaborative location error corrector 221 may perform the functionality of collaborative location error corrector 121 (FIG. 1) and/or database 222 may perform the functionality of database 122 (FIG. 1).

In some demonstrative embodiments, group 250 may include one or more wireless communication devices, e.g., a wireless communication device 211, a wireless communication device 212, a wireless communication device 213, a wireless communication device 214 and a wireless communication device 215. At least one of the devices of group 250, e.g., device 211, may perform the functionality of device 130 (FIG. 1), and at least one of the devices of groups 250, e.g., device 214, may perform the functionality of device 140 (FIG. 1).

In some demonstrative embodiments, collaborative location error corrector 221 may dynamically define groups 250, 251, 252, 253 and/or 254, e.g., based on the location of the devices 201. For example, collaborative location error corrector 221 may define devices 211, 212, 213, 214, and/or 215, to be included in group 250 corresponding to a predefined area. For example, a device may be included in group 250, if the device is located within a predefined radius from a particular point.

In some demonstrative embodiments, collaborative location error corrector 221 may define groups 250, 251, 252, 253 and/or 254 according to a geographical location of devices 201, e.g., groups 250, 251, 252, 253 and/or 254 may include two or more devices located in a common geographical area, e.g., a state, a city, a neighborhood and the like. For example, a first group e.g., group 250, may include a first plurality of devices, e.g., devices 211, 212, 213, 214, and/or 215, located in a first location or area, and a second, different, group, e.g., group 253, may include a second, plurality of different devices 201 located in a second, different, location or area.

In some demonstrative embodiments, device 211 may include a mobile device configured to generate location fix data to estimate a location of device 211. For example, device 211 may include a GNSS mobile device.

For example, device 211 may use location raw information received from at least one location origin, e.g., a satellite 204, to calculate the estimated location of device 211.

In some demonstrative embodiments, device 211 may provide to device 202 a last estimated location (location fix) of device 201. Collaborative location error corrector 221 may assign device 201 to group 250, e.g., based on the location fix received from device 201.

In some demonstrative embodiments, device 202 may receive a plurality of error reports from one or more devices of group 250. For example, device 211 may send an error report to device 202 indicating an error in an estimated location of device 211, and device 212 may send an error report indicating an error in an estimated location of device 212, e.g., as described above.

In some demonstrative embodiments, database 222 may be configured to store a plurality of error reports from the devices of groups 250. For example, database 222 may store the error reports reported by devices 211, 212 and/or other error reports reported by one or more other devices of groups 250, 251, 252, 253 and/or 254.

In some demonstrative embodiments, database 222 may store the error reports in association with a common geographical area. For example, each specific common geographical area, e.g., an area associated with group 250, may be associated with a list of the error reports reported by devices located in the common area, e.g., errors reported by devices 211, 212, 213, 214, and/or 215.

In some demonstrative embodiments, collaborative location error corrector 221 may assign weights for each error report according to a reliability level of each report, e.g., according to the date and/or time of the error report. For example, collaborative location error corrector 221 may assign a first (high) weight to a first error report, which was received recently, e.g., from device 211, and a second (low) weight, which is lesser than the first weight, to a second error report which was received prior to the first error report, e.g., from device 213.

In some demonstrative embodiments, collaborative location error corrector 221 may determine correction information based on a combination of the plurality of error reports. For example, the correction information may be determined by applying a weighted average to the plurality of error reports associated with the common geographical area. For example, collaborative location error corrector 221 may receive a first error report from device 211 and a second error report from device 213 of group 250. Collaborative location error corrector 221 may assign a first weight to the first error report and a second weight to the second error report, e.g., as described above. Collaborative location error corrector 221 may determine the correction information corresponding to group 250, e.g., by calculating a weighted average using the first and the second error reports according to the first and the second weights.

In some demonstrative embodiments, one or more devices 201 may share at least one common satellite for location estimation. For example, devices 211, 212, 213, 214, and/or 215 may share satellite 204 and may receive from satellite 204 raw location information. In another example, one or more devices of group 250, e.g., devices 211, 212, 213, 214, and/or 215, and one or more devices 201 of group 251 may share common satellite 204, e.g., if satellite 204 covers the areas of groups 250 and 251.

In some demonstrative embodiments, the correction information may relate to common satellite 204. For example, the error reports received from one or more devices of group 250 and/or 251 may indicate an orbit error of satellite 204. Accordingly, the correction information may include an interpolation on expected orbit of satellite 204, e.g., modified long-term ephemerides parameters of satellite 204, which may be utilized by the devices of groups 250 and/or 251 to generate a location fix, which overcomes the orbit error of satellite 204.

In some demonstrative embodiments, collaborative location error corrector 221 may provide the correction information to one or more devices of group 250. For example, collaborative location error corrector 221 may provide the correction information to device 214 and/or to one or more other devices of group 250.

In some demonstrative embodiments, device 214 may receive the correction information from collaborative location error corrector 121, e.g., even without reporting an error report to device 202. For example, device 214 may not have error detection and error correction capabilities. Device 214 may use the correction information to generate a better location fix of device 214, e.g., even if device 214 may not have the error detection and correction capabilities.

In some demonstrative embodiments, device 202 may be implemented, for example, by a dedicated server device capable of communicating with the devices of groups 250, 251, 252, 253 and/or 254.

In another example, one of the devices of group 250, e.g., device 211, may be capable of performing one or more operations, which may be performed by device 202. For example, device 211 may be capable of performing the collaborative location error corrector functionality of device 202.

In yet another example, device 202 may be included as part of every group, e.g. of groups 250, 251, 252, 253 and/or 254. Device 202 may be located within a geographical area of the corresponding group, and may be configured to provide network services and collaborative error correction services to the devices of the group 250.

Figure 3:
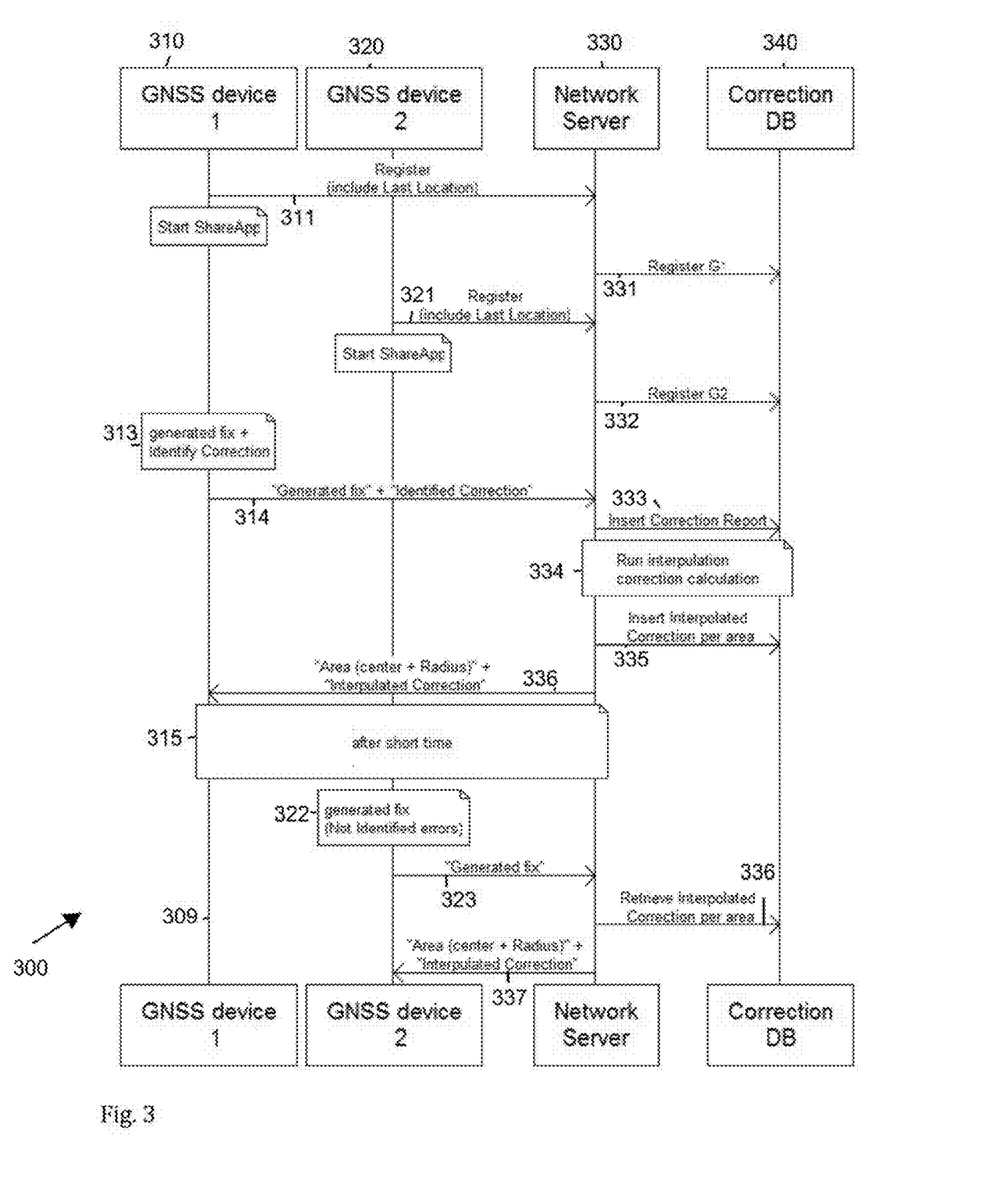
FIG. 3 is a schematic sequence diagram of operations and interactions between two Global Navigation Satellite System (GNSS) devices, a network server, and a database, in accordance with some demonstrative embodiments.

Reference is now made to FIG. 3, which schematically illustrates a sequence diagram 300, which demonstrates operations and interactions between two GNSS devices 310 and 320, e.g., devices 130 and 140 (FIG. 1), respectively, a network server 330, e.g., device 102 (FIG. 1), and a correction database 340, e.g., database 122 (FIG. 1), in accordance with some demonstrative embodiments.

As shown in FIG. 3, device 310 may send a message 311 to network server 330 including its last location. Network server 330 may register (331) device 310 in correction database 322 according to the last location of device 310.

As shown in FIG. 3, device 320 may send a message 321 to network server 330 including its last location. Network server 330 may register (332) device 320 in correction database 322 according to the last location of device 320.

In some demonstrative embodiments, devices 310 and 320 may be located in a common geographical area. Network server may 330 may assign devices 310 and 320 to a common group corresponding to the common geographical location, e.g., as described above.

As shown in FIG. 3, device 310 may detect an error 313 in an estimated location of device 310. Device 310 may send an error report 314 to network server 330 including a map fix of device 310 and an identified correction to the error. For example, device 310 may identify an error indicating that the estimated location of device 310 may have an offset. Device 310 may send error report 314 including a map fix of device 310 and a calculated offset from the map fix to correct the error.

As shown in FIG. 3, after receiving error report 314, network server 330 may store in database 340 an error report 333, e.g., including error report 314, in association with a geographical location of device 310.

As shown in FIG. 3, network server 330 may process (334) error report 333 and may determine correction information 335 corresponding to the geographical location, e.g., according to error report 333. Correction information 335 may be stored in database 340. For example, network server 330 may determine correction information 335 based on one or more error reports received from device 310.

As shown in FIG. 3, network server 330 may send to device 310 a message 336 including correction information associated with the geographical location of device 310. For example, network server 330 may send modified values and/or parameters for generating location fix data of device 310, e.g., based on correction information 335.

As shown in FIG. 3, device 320 may generate a location fix 322, e.g., after a short time 315, Device 320 may send a message 323 to network server 330 including location fix 322. Device 320 may not identify any error in an estimated location of device 320, for example, if device 320 does not have error detection and/or error correction capabilities.

As shown in FIG. 3, network server 330 may retrieve from database 340 correction information 336 including correction information according to a geographical location of device 320. For example, device 320 may be in a common geographical location with device 310 and the correction information may include correction information 334. Network server 330 may send a message 337 to device 320 including the correction information associated with the geographical location of device 320.

In some demonstrative embodiments, device 320 may utilize correction information 334 to generate a more accurate location fix of device 320, even if device 320 does not have any capabilities to identify and/or to correct location errors.

Figure 4:
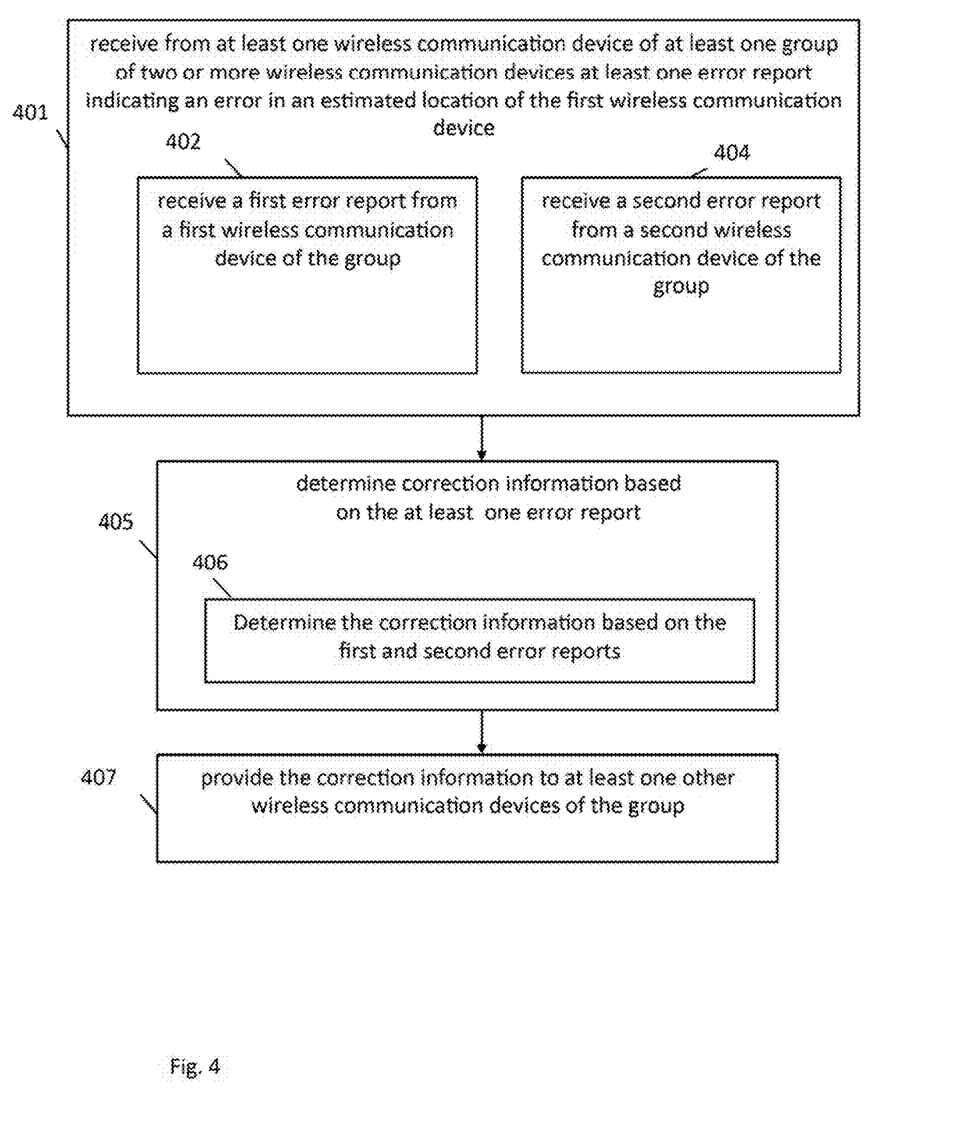
FIG. 4 is a schematic flow chart illustration of a method of collaborative location error correction, in accordance with some demonstrative embodiments.

Reference is now made to FIG. 4, which schematically illustrates a method of collaboratively correcting location errors, in accordance with some demonstrative embodiments. In some embodiments, one or more of the operations of the method of FIG. 4 may be performed by any suitable wireless communication system, e.g., system 100 (FIG. 1) and/or system 200 (FIG. 2), wireless communication device, e.g., device 102 (FIG. 1), device 130 (FIG. 1), device 140 (FIG. 1) and/or device 202 (FIG. 2).

As indicated at block 401, the method may include receiving from at least one wireless communication device of at least one group of two or more wireless communication devices an error report indicating an error in an estimated location of the wireless communication device. For example, device 102 (FIG. 1) may receive an error report from device 130 (FIG. 1) indicating an error in an estimated location of device 130 (FIG. 1), e.g., as described above.

As indicated at block 402, receiving the at least one error report from the at least one wireless communication device of the group may include receiving a first error report from a first wireless communication device of the group, the error report indicating an error in an estimated location of the first wireless communication device. For example, device 202 (FIG. 2) may receive error report from device 211 indicating an error in an estimated location of device 211 (FIG. 2), e.g., as described above.

As indicated at block 404, receiving the at least one error report from the at least one wireless communication device of the group may include receiving a second error report from a second wireless communication device of the group, the error report indicating an error in an estimated location of the second wireless communication device. For example, device 202 (FIG. 2) may receive error report from device 213 (FIG. 2) indicating an error in an estimated location of device 213 (FIG. 2), e.g., as described above.

As indicated at block 405, the method may include determining correction information based on the at least one error report. For example, collaborative location error corrector 121 (FIG. 1) may determine the correction based on the error report from device 130 (FIG. 1), e.g., as described above.

As indicated at block 406, determining the correction information may include determining correction information based on the first and second error reports. For example, collaborative location error corrector 221 (FIG. 2) may determine the correction based on the first error report from device 211 and the second error report from device 213 (FIG. 2), e.g., as described above.

As indicated at block 407, the method may include providing the correction information to at least one other wireless communication device of the group. For example, collaborative location error corrector 121 (FIG. 1) may provide the correction information to device 140 of group 150 (FIG. 1), e.g., as described above.

Figure 5:
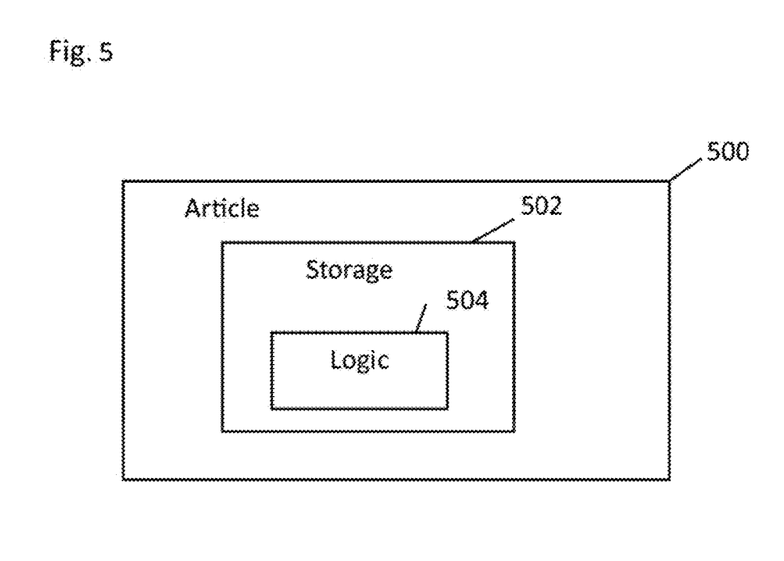
FIG. 5 is a schematic illustration of an article of manufacture, in accordance with some demonstrative embodiments.

Reference is made to FIG. 5, which schematically illustrates an article of manufacture 400, in accordance with some demonstrative embodiments. Article 500 may include a non-transitory machine-readable storage medium 502 to store logic 504, which may be used, for example, to perform at least part of the functionality of collaborative location error corrector 121 (FIG. 1), collaborative location error corrector 221 (FIG. 2), application 131 (FIG. 1), application 141 (FIG. 1), and/or to perform one or more operations of the method of FIG. 4. The phrase "non-transitory machine-readable medium" is directed to include all computer-readable media, with the sole exception being a transitory propagating signal.

In some demonstrative embodiments, article 500 and/or machine-readable storage medium 502 may include one or more types of computer-readable storage media capable of storing data, including volatile memory, non-volatile memory, removable or non-removable memory, erasable or non-erasable memory, writeable or re-writeable memory, and the like. For example, machine-readable storage medium 502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A device comprising:

a communication unit to communicate with at least one group of two or more mobile wireless communication devices; and a collaborative location error corrector to collaboratively correct location errors for the at least one group of two or more mobile wireless communication devices, said collaborative location error corrector is to receive an error report from at least a first mobile wireless communication device of said group, the error report including an estimated location of the first mobile wireless communication device based on signals from a location origin transmitter, the error report including an indication of an error offset to correct an error in the estimated location of said first mobile wireless communication device, the collaborative location error corrector to determine correction information based on a combination of a plurality of error reports from said group of mobile wireless communication devices, the plurality of error reports comprising at least the error report from said first mobile wireless communication device and another error report from another mobile wireless communication device of said group, the correction information comprising information to be applied to a location measurement based on the signals from the location origin transmitter, the correction information comprising at least one parameter selected from the group consisting of a parameter to correct an orbit error, a parameter to correct an atmospheric-based error, and a parameter to correct an offset of a map fix, the collaborative location error corrector to trigger providing said correction information to at least a second mobile wireless communication device of said group.

2. The device of claim 1 comprising a database to store said plurality of error reports.

3. The device of claim 1, wherein said location error corrector is to dynamically define said at least one group of mobile wireless communication devices based on a location of said mobile wireless communication devices.

4. The device of claim 1, wherein the mobile wireless communication devices of said group share at least one common satellite for location estimation, and wherein said correction information relates to said common satellite.

5. The device of claim 4, wherein said correction information includes information to correct at least one parameter selected from the group consisting of an atmospheric-based error and an orbit error associated with said common satellite.

6. The device of claim 1, wherein said at least one group of mobile wireless communication devices comprises a plurality of groups of mobile wireless communication devices defined according to a geographical location, such that mobile wireless communication devices of each group of said groups are located within a common geographical area.

7. The device of claim 1 comprising a server associated with said group of mobile wireless communication devices.

8. The device of claim 1, wherein said device comprises a mobile wireless communication device included in said group of mobile wireless communication devices.

9. The device of claim 1, wherein said group of mobile wireless communication devices comprise one or more global navigation satellite system (GNSS) devices.

10. The device of claim 9, wherein said error report from said first mobile wireless communication device comprises at least one information element selected from the group consisting of GNSS assisted information, a location error estimation, and GNSS fix information.

11. A method comprising:
receiving a first error report from a first mobile wireless communication device of at least one group of two or more mobile wireless communication devices, the first error report comprising an estimated location of the first mobile wireless communication device based on a first measurement with an Access Point (AP), said first error report including an indication of a first error offset to correct an error in the estimated location of said first mobile wireless communication device based on the first measurement with the AP;
receiving a second error report from a second mobile wireless communication device of said group of mobile wireless communication devices, the second error report comprising an estimated location of the second mobile wireless communication device based on a second measurement with said AP, said second error report including an indication of a second error offset to correct an error in the estimated location of said second mobile wireless communication device based on the second measurement with the AP;
determining correction information corresponding to the AP based on a combination of a plurality of error reports from said group of mobile wireless communication devices, the plurality of error reports comprising said first and second error reports, the correction information comprising information to be applied to a location measurement with the AP, the correction information comprising at least one parameter selected from the group consisting of a parameter to correct an orbit error, a parameter to correct an atmospheric-based error, and a parameter to correct an offset of a map fix; and
providing said correction information to one or more mobile wireless communication devices of said group.

12. The method of claim 11 comprising dynamically defining said at least one group of mobile wireless communication devices based on a location of said mobile wireless communication devices.

13. The method of claim 11, wherein the mobile wireless communication devices of said group share at least one common AP for location estimation, and wherein said correction information relates to said common AP.

14. The method of claim 13, wherein said correction information includes information to correct a location of the common AP.

15. The method of claim 11, wherein said at least one group of mobile wireless communication devices comprises a plurality of groups of mobile wireless communication devices defined according to a geographical location, such that mobile wireless communication devices of each group of said groups are located within a common geographical area.

16. The method of claim 11, wherein said group of mobile wireless communication devices comprises one or more global navigation satellite system (GNSS) devices.

17. A non-transitory product including a storage medium having stored thereon instructions that, when executed by a machine, result in:
communicating with at least one group of two or more mobile wireless communication devices;
receiving at least one error report from at least one mobile wireless communication device of the at least one group of the two or more mobile wireless communication devices, said error report from the mobile wireless communication device including an estimated location of the mobile wireless communication device based on signals from a location origin transmitter, the error report including an indication of an error offset to correct an error in the estimated location of said mobile wireless communication device;
determining correction information based on a combination of a plurality of error reports from said group of mobile wireless communication devices, the plurality of error reports comprising said at least one error report from said at least one mobile wireless communication device, the plurality of error reports comprising error reports from at least two mobile wireless communication devices of said group, the correction information comprising information to be applied to a location measurement based on the signals from the location origin transmitter, the correction information comprising at least one parameter selected from the group consisting of a parameter to correct an orbit error, a parameter to correct an atmospheric-based error, and a parameter to correct an offset of a map fix; and triggering providing of said correction information to one or more mobile wireless communication device of said group of mobile wireless communication devices.

18. The product of claim 17, wherein said instructions result in:
receiving a first error report from a first mobile wireless communication device of said group;
receiving said second error report from said second mobile wireless communication device of said group; and
determining said correction information based on said first and second error reports.

19. The product of claim 17, wherein said instructions result in dynamically defining said at least one group of mobile wireless communication devices based on a location of said mobile wireless communication devices.

20. The product of claim 17, wherein the mobile wireless communication devices of said group share at least one common satellite for location estimation, and wherein said correction information relates to said common satellite.

21. The product of claim 17, wherein said at least one group of mobile wireless communication devices comprises a plurality of groups of mobile wireless communication devices defined according to a geographical location, such that mobile wireless communication devices of each group of said groups are located within a common geographical area.

* * * * *